United States Patent [19]
Wernberg et al.

[11] Patent Number: 5,490,379
[45] Date of Patent: Feb. 13, 1996

[54] FUEL METERING UNIT

[75] Inventors: Donald E. Wernberg, Rockford, Ill.;
Gregory A. Molenaar, Loveland,
Colo.; Daniel F. Miller, Beloit, Wis.

[73] Assignee: Woodward Governor Company,
Rockford, Ill.

[21] Appl. No.: 182,444

[22] Filed: Dec. 20, 1993

[51] Int. Cl.⁶ .................................................. F02C 9/28
[52] U.S. Cl. ............................................... 60/39.281
[58] Field of Search ........................... 60/39.281, 39.091,
60/243

[56] References Cited

U.S. PATENT DOCUMENTS

| | | | |
|---|---|---|---|
| 3,381,470 | 5/1968 | Hammerstein et al. | 60/39.281 |
| 3,820,323 | 6/1974 | Burnell et al. | 60/39.281 |
| 4,270,345 | 6/1981 | Kast | 60/39.281 |
| 4,608,820 | 9/1986 | White et al. | 60/39.281 |
| 4,793,133 | 12/1988 | White et al. | 60/39.281 |
| 4,794,755 | 1/1989 | Hutto et al. | 60/39.281 |

*Primary Examiner*—Louis J. Casaregola
*Attorney, Agent, or Firm*—Leydig, Voit & Mayer, Ltd.

[57] ABSTRACT

A fuel metering unit for an aircraft gas turbine engine has both electronic and manual control, both compensated for altitude variations. A three-dimensional cam is used to control the position of a fuel metering valve. One axis of the 3-D cam is electronically controlled and another is mechanically controlled. Electronic control is the normal mode and sets the electronic axis to provide a fuel metering valve setting which delivers a mass flow rate to the engine as demanded by the position of the fuel lever as interpreted by the electronic control. Upon failure of the electronic control, the position of the 3-D cam along the electronic axis is mechanically locked so that any further changes in fuel metering valve position are a function solely of the position of the power lever as translated to the mechanical axis of the 3-D cam. Transfer from electronic to manual control is therefore "bumpless."

19 Claims, 4 Drawing Sheets

FUEL METERING UNIT

FIELD OF THE INVENTION

This invention relates to fuel metering units for aircraft, and particularly to such a unit for high performance helicopters.

BACKGROUND OF THE INVENTION

Full authority digital electronic controls (FADEC's) are being applied to numerous aircraft engines, and it is desirable to apply them to helicopter engines, particularly high performance helicopters. As a necessary safety measure, full mechanical backup is required for such electronic controls. Particularly in the case of helicopters, the transition between electronic control and manual control upon failure of the former can cause a highly undesirable transient in the fuel supply to the engine. The failure or shutdown of the electronic control is itself a sufficiently significant occurrence, such that the introduction of an engine speed change due to a transient in fuel supply occasioned by the transfer is not only highly undesirable but also probably dangerous.

Insofar as applicants are aware, the prior art has approached the problem of transfer from electronic to manual backup control in a helicopter by attempting to reduce the magnitude of the transient so that the change in helicopter performance upon switching from electronic to manual control is not very significant. It would be desirable, of course, to achieve a bumpless transfer, but insofar as applicants are aware, such a transfer has not been available heretofore.

SUMMARY OF THE INVENTION

In view of the foregoing, it is a general aim of the present invention to improve the safety and reliability of helicopter fuel metering units by providing a fuel metering unit which achieves a bumpless transfer when transitioning from electronic to manual control.

In accomplishing that aim, it is an object of the present invention to control the fuel metering valve of the fuel metering unit in such a way that no transient is introduced to the metered flow of fuel when control is switched from electronic to manual control.

It is a further object of the invention to provide a fuel metering unit which automatically adjusts the mass flow rate of fuel to the engine as a function of aircraft altitude, and does so in both the automatic and manual modes, so that the altitude compensation does not introduce a transient when switching from automatic to manual control.

A further object of the present invention is to provide an electronic fuel metering unit having means for responding to overspeed conditions of the engine by reducing the flow rate, to reduce engine speed below a predetermined limit, and to do so in a way which controls the rate of change of fuel flow to prevent flameouts or surges.

It is also an object in providing such a fuel metering unit to provide an automatic dump feature which purges the engine of fuel in an air-start situation so that an air start can be accomplished in a safe manner after engine purge.

It is a feature of the invention that the fuel metering unit includes a three-dimensional cam which controls the operation of a fuel metering valve. The three-dimensional cam has two axes of control, a manual axis and an electronic axis. In the normal mode, a FADEC controls the electronic axis to provide the desired flow rate to the control, and compensates for movement of the three-dimensional cam along the mechanical axis occasioned by the manual control. Thus, fuel flow to the engine is entirely a function of the electronic control, although the exact position of the three-dimensional cam is a function of both the electronic and mechanical controls. When the system switches to the backup mode, such as by failure or shutdown of the electronic control, the electronic axis is locked, and all further adjustment of the fuel metering valve is by adjustment of the three-dimensional cam along the mechanical axis in the thus-locked position along the electronic axis. As a result, transfer from electronic to manual control is without any transient whatsoever, a transfer labeled "bumpless" herein.

It is a further feature of the invention that altitude compensation is accomplished directly on the elements downstream (control-wise) of the three-dimensional cam, such that altitude compensation is accomplished for both electronic and manual control, and switching between such controls is transparent insofar as altitude compensation is concerned.

A further feature of the invention is the provision of an automatic dump feature selected by the three-dimensional cam in both the manual and automatic modes, so that the engine can be safely restarted after purging of the fuel from the engine, such as in an air start, in both automatic and manual modes.

Finally, a further feature of the invention is the overspeed limit control which operates independently of the fuel valve but achieves a reduction in engine speed in response to an overspeed condition, and a return to normal system control upon elimination of the overspeed condition, at controlled rates which are adapted to avoid engine surges or flameouts.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
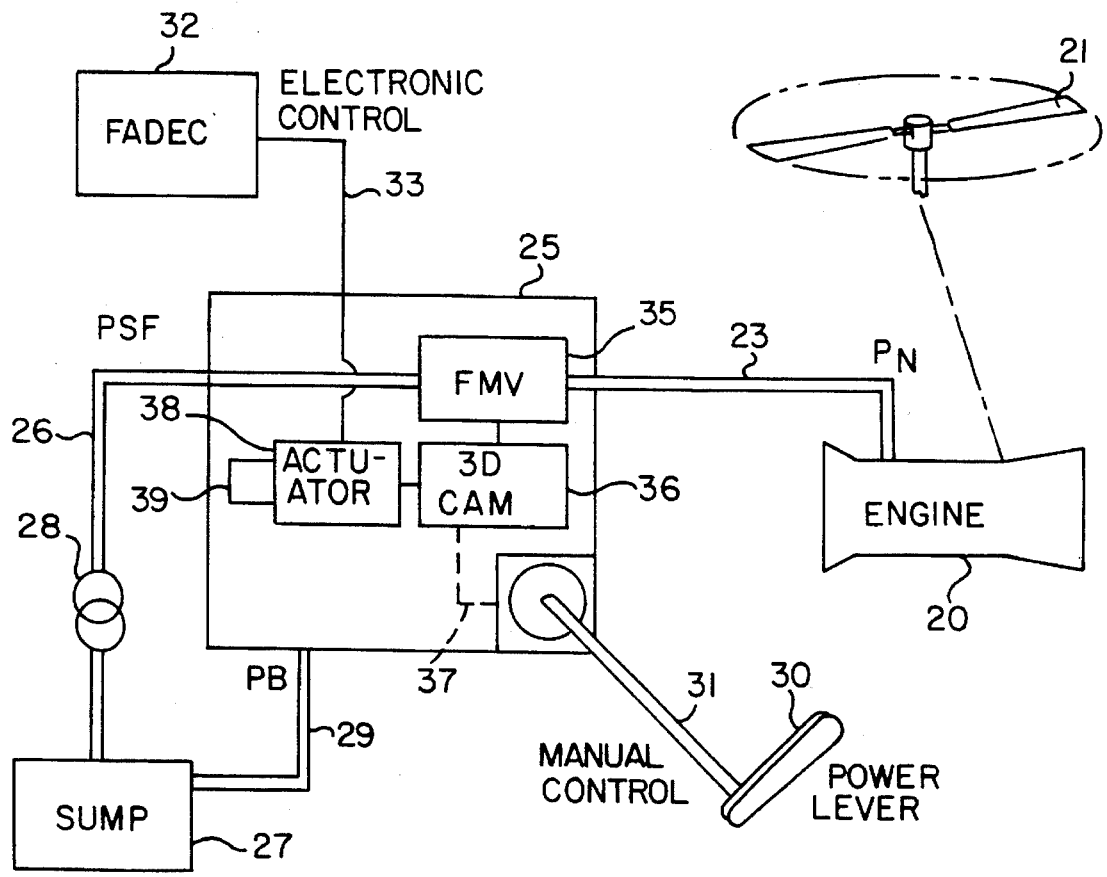
FIG. 1 is a global block diagram illustrating the operative elements of a helicopter gas turbine engine fuel supply system and control.

Turning now to the drawings, FIG. 1 schematically illustrates the relationship between the elements of a helicopter gas turbine engine and its fuel supply system. A gas turbine engine 20 drives a schematically illustrated helicopter blade 21. A metered supply of fuel for the engine is provided by way of a fuel line 23 (at pressure $P_N$) which in turn is supplied by a fuel metering unit 25. The fuel metering unit, in turn, has a supply of fuel coupled thereto on an input line 26. The input fuel is derived from a fuel sump 27 and pressurized to a pressure $P_{SF}$ by a fuel pump 28. The fuel metering unit typically has a bypass valve which returns excess flow to the sump (at pressure $P_B$) by way of a bypass line 29.

The fuel metering unit 25 is adapted for both electronic and manual control. A power lever 30 is mechanically coupled as by a linkage 31 to the fuel metering unit 25. Similarly, an electronic control 32, typically a FADEC, is electronically coupled by electrical control lines 33 to the fuel metering unit 25.

The fuel metering unit 25 includes a fuel metering valve 35 which has a control mechanism preferably in the form of a three-dimensional cam 36. The three-dimensional cam 36 has two control axes. One of the control axes is controlled by a mechanical linkage represented by dashed line 37 which in turn is coupled to the mechanical control linkage 31. A second axis of the 3-D cam 36 is controlled by an electrical actuator 38 which is responsive to signals on the control bus 33 driven by the FADEC 32. The actuator 38 is adapted to control the second axis of the 3-D cam to allow electronic control of the position of the fuel metering valve 35. In accordance with the invention, the actuator 38 has a detent means 39 associated therewith so that the actuator, and thus the 3-D cam, is locked in position so that no movement of the 3-D cam along the electronic axis can occur when the FADEC is shut down or non-operational. This detent means 39 provides a locking means to positively disable one of the axes of control of the 3-D cam, thereby to limit the 3-D cam to a single axis of control which in turn is driven by the mechanical linkage 31 and the power lever 30. With the electronic axis thus disabled and locked in position, the mechanical axis is the sole means of controlling the position of the fuel metering valve and thus the engine speed. By virtue of the 3-D cam 36 and detent means 39, the electronic axis is locked in its last adjusted position so that transfer from electronic to mechanical control, such as in the case of a FADEC failure or shutdown, is accomplished in a bumpless fashion without any transient of the fuel valve or the fuel supplied to the engine.

Figure 2:
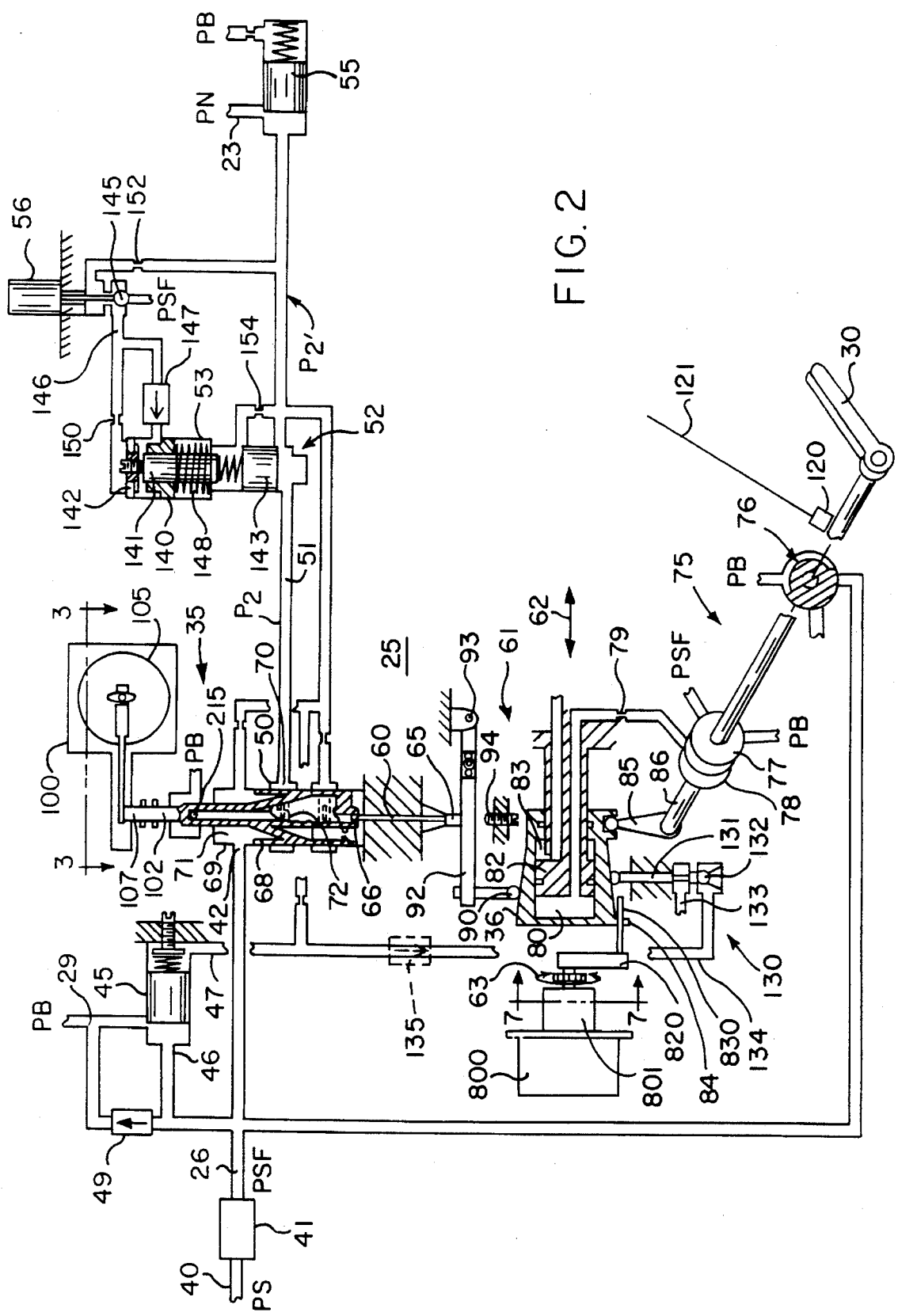
FIG. 2 is a schematic diagram illustrating a fuel metering unit constructed in accordance with the present invention.

FIG. 2 shows the fuel metering unit 25 and its associated components in greater detail. The fuel input line 26 is shown to the left of the drawing, comprising a fuel supply $P_S$ indicated at 40 passed through a fuel filter 41, at a pressure on the outlet side of the filter denoted $P_{SF}$. The fuel line 26 is coupled to an inlet 42 of the fuel metering valve generally indicated at 35. A bypass valve 45 is coupled across the fuel metering valve 35 to maintain a substantially constant pressure drop across the metering orifice of the fuel metering valve 35. As a result, the mass flow rate of fuel to the engine is directly proportional to the opening of the fuel metering orifice. Thus, the bypass valve 45 has a first inlet 46 coupled to the high pressure supply $P_{SF}$, and a second sensing inlet 47 coupled to sense the outlet pressure $P_2$ produced at the output of the fuel metering valve 35. In the illustrated embodiment, the output pressure actually sensed is that denoted $P_{2'}$, which in most cases is the same pressure as that produced at the output $P_2$ of the fuel metering valve 35, except when an overspeed actuator comes into play. In the normal operating circumstances, the pressure $P_{2'}$ and the pressure $P_2$ are substantially the same. Thus, the bypass valve 45 senses the pressure drop across the metering orifice of the fuel valve 35, and adjusts its position to maintain a constant pressure across that orifice. In order to maintain that constant pressure, a variable amount of fuel is bypassed into the bypass line 29 for return to the sump denoted as pressure $P_B$. A safety release valve 49 is also incorporated in the high pressure supply and is adapted to return fuel from the high pressure supply $P_{SF}$ to the sump $P_B$ whenever the pressure exceeds a predetermined maximum level, such as 650 psig.

An outlet port 50 from the fuel metering valve 35 is connected to supply fuel to the engine. The pressure at the outlet port 50 is $P_2$, a predetermined amount above $P_{SF}$ as controlled by the bypass valve 45. Fuel flowing through a line 51, which is coupled to the outlet port 50, flows past a regulating orifice 52 controlled by an overspeed actuator 53 whereupon it is passed by way of a pressurizing valve 55 to the fuel line 23 which feeds the engine at pressure $P_N$. The pressurizing valve 55 senses the difference between pressure $P_2$ and the sump pressure $P_B$, so as to close off and prevent fuel flow into the engine fuel line 23 whenever the pressure $P_2$ is below a predetermined minimum. The pressurizing valve 55 also raises the pressure in the fuel metering unit by (partially) closing, in conditions when the flow rate to the engine is insufficient to achieve an adequate operating pressure in the fuel metering unit. Whenever the system is operational to raise the fuel pressure above the predetermined minimum required by the pressurizing valve 55, the valve opens, at which time the pressure $P_N$ supplied to the engine is substantially the same as the pressure $P_2$ produced at the output of the fuel metering valve, less minor losses in the piping and the like.

Focusing on the overspeed system only briefly for the moment, an overspeed actuator 53 controls the orifice 52, and is responsive to an overspeed solenoid 56. Whenever an overspeed condition is sensed, the overspeed solenoid 56 is actuated to cause the overspeed actuator 53 to begin to close the pressure restricting orifice 52. As a result, the pressure drop across the metering orifice 72 of the fuel metering valve 35 is reduced, decreasing fuel flow to the engine and reducing the speed of the engine, until the overspeed condition is corrected. The manner in which the overspeed system is constructed and operates will be described in greater detail below.

The fuel metering valve 35 has a control input 60 which is responsive to a multiple axis mechanical control generally indicated at 61, which includes a three-dimensional cam 36 having a manual control axis generally indicated at 62 and an electrical control axis generally indicated at 63. The fuel metering valve control linkage 60 includes a hydraulic follower mechanism having a mechanically displaceable piston 65 controlling a pilot aperture 66 which is adapted to control the axial position of a cylindrical valve member 68 which rides in a housing 69 machined with outlet port 70 which supplies the high pressure outlet $P_2$. The high pressure inlet 42 provides high pressure fuel to a chamber 71 which is coupled as an input to the metering port 72 and thence to the output 70. The vertical position of the valve member 68 controls the degree of opening of the port 72 and thereby the mass flow of fuel to the engine. The vertical position of the valve 68 is in turn controlled by the position of the piston 65 which in turn is controlled by the multiple axis control mechanism 61. The piston and porting arrangement will be described more completely below in connection with FIG. 4.

The multiple axis control mechanism 61 is based on a three-dimensional cam 36 which has, in the preferred embodiment, two axes of control. In the illustrated embodiment, a mechanical axis 62 is a translation axis parallel to the axis of the three-dimensional cam 36 and is controlled by a mechanical linkage 75 coupled to the power lever 30. The mechanical linkage 75 includes a tracking servo pilot valve adapted to limit the rate of movement of the 3-D cam along the mechanical axis 62, even when the power lever 30 is moved at a very rapid rate. Thus, movement of the lever 30 tends to adjust the tracking servo pilot valve which includes a pilot portion 77 which couples either high pressure $P_{SF}$ or low pressure $P_B$ to the tracked portion 78 of the tracking servo pilot valve. The source or sump pressure which is coupled to the output portion 78 of the valve is coupled through a restricting orifice 79 to an internal chamber 80 formed between the three-dimensional cam 36 and a stationary "bulkhead" 82 in the cam control mechanism. A second chamber 83 has high pressure $P_{SF}$ applied thereto, but has a smaller piston area than the chamber 80. Thus, when it is desired to translate the three-dimensional cam to the left as seen in FIG. 2, the power lever 30 is moved in a direction which causes high pressure $P_{SF}$ to be coupled through the orifice 79 to the chamber 80. Since the chamber 80 has a larger piston area than the chamber 83, the higher force generated in the chamber 80 begins to move the three-dimensional cam 36 to the left at a rate controlled by the orifice 79. A tracking linkage 85 is coupled between the three-dimensional cam and a rod 86 adapted to readjust the valve mechanism within follower 78, balancing the tracking pilot servo valve to stop the translation of the 3-D cam when the axial position of the cam matches that demanded by the power lever 30.

Similarly, when it is desired to translate the three-dimensional cam to the right as illustrated in FIG. 2, the power lever 30 is shifted in a direction which causes hydraulic sump $P_B$ to be coupled through orifice 79 to the chamber 80. By virtue of the higher pressure then present in chamber 83 as compared to chamber 80, the three-dimensional cam will begin to be translated to the right. The axial position of the three-dimensional cam is coupled by linkage 85 and shaft 86 to readjust the follower valve 78 to balance the axial position of the three-dimensional cam against the position demanded by the power lever 30. Again, the rate of movement is restricted by the size of the orifice 79.

It is of course possible to provide different rates of movement in the advance and retard directions by providing separate orifices and check valves for advance and retard, and separate control lines to the hydraulic operator which controls the axial position of the three-dimensional cam.

Primary or normal control of the fuel metering unit 25 is accomplished by way of the FADEC 32 (FIG. 1) operating through an actuator. In the illustration of FIG. 2, the electrical actuator is represented by a stepping motor 800 coupled by a linkage 820 to a pin 830 fit within a slot 84 adapted to control the angular position of the three-dimensional cam 36. Thus, in the FIG. 2 illustration, the electronic control axis of the three-dimensional cam 36 is the rotational axis (illustrated by arrow 63) whereas the mechanical control axis is the translation axis 62). The mechanical and electrical area can be interchanged, if desired.

In accordance with an important aspect of the invention, the electrical actuator, in the illustrated embodiment, the stepping motor 800, has a mechanical detent associated therewith so that the motor is locked in a fixed mechanical position whenever drive pulses are not supplied to the motor. Thus, when the motor 800 is configured as a permanent magnet stepping motor, particularly one suited for bipolar drive, the mechanical detent is accomplished by the attraction between the rotor teeth and stator teeth (not shown), with one set of such teeth being permanently magnetized by the permanent magnets utilized in such motors.

In practicing the invention, it is important that the detent be a tight locking detent, and to that end, we have found that a high precision stepping motor 800 is preferred, one having on the order of about 900 steps per revolution. Thus, each drive pulse supplied to the motor rotates the motor only a single step, i e , about 0.4°, with the magnetic attraction between the pole teeth after a step is accomplished being adapted to lock the motor in that position. With only 0.4° between steps, the locking will be seen to be very tight, preventing any substantial rotation of the motor except when it is electrically driven. A gear box 800 coupled between the 3-D cam, preferably providing a reduction of about 12 to 1, provides a uni-directional mechanical advantage, which further contributes to the locking torque. As a result, the rotational axis 63 of the three-dimensional cam will be tightly locked when the electronic control is shut down or non-functional, in effect turning the three-dimensional cam (with 2 axes of control) into a two-dimensional control mechanism, having only one axis of control, that being mechanically coupled to the power lever 30.

In practicing the invention, a cam follower 90 is adapted to ride on the surface of the 3-D cam to control the position of valve follower 65 in accordance with the shape of the three-dimensional cam. The shape of the three-dimensional cam, in turn, is related to $W_F/P_0$, where $W_F$ is the mass flow rate of fuel to the engine, and $P_0$ is ambient pressure. It will be seen that the fuel valve has a second mechanical signal supplied thereto relating to $P_0$, intended to compensate fuel flow for changes in altitude. With such compensation, the fuel delivered by the fuel valve is then $W_F$ as demanded by the three-dimensional cam, compensated for altitude variations.

Thus, the follower 90 of the three-dimensional cam 36 is attached to a horizontal arm 92 which is pivoted at 94 so that the rise or fall of the follower 90 will be translated into a corresponding rise or fall of the fuel valve plunger 65. A mechanical stop 94 sets a maximum mass flow rate for the system.

Figure 3:
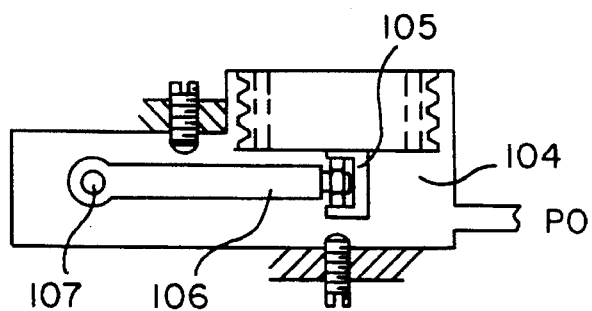
FIG. 3 is a partial sectional view taken along the line 3—3 of FIG. 2 showing the pressure sensor mechanism for adjusting the fuel metering valve as a function of aircraft altitude.

As noted above, the fuel valve 35 is compensated for variations in altitude. Thus, a pressure sensor 100 is adapted to sense ambient pressure, $P_0$, and via a rotary linkage 102 to adjust the metering orifice 72 of the fuel valve 35 to compensate for changes in altitude. Referring to FIG. 3, there is shown a partial sectional view of the pressure sensor 100. It is seen that ambient pressure is applied via a chamber 104 to one side of a bellows mechanism 105. The inside pressure of the bellows is evacuated to near vacuum. The bellows mechanism is coupled by a mechanical linkage 106 to pivot about a shaft 107. The shaft 107 in turn is coupled to the fuel valve piston 63 so as to rotate the piston in dependence upon changes in ambient pressure $P_0$. Thus, if pressure increases, the bellows 105 moves inwardly, causing the shaft 107 to pivot counterclockwise (as seen in FIG. 3), serving to rotate the piston 68 to further open the orifice 72.

Figure 4:
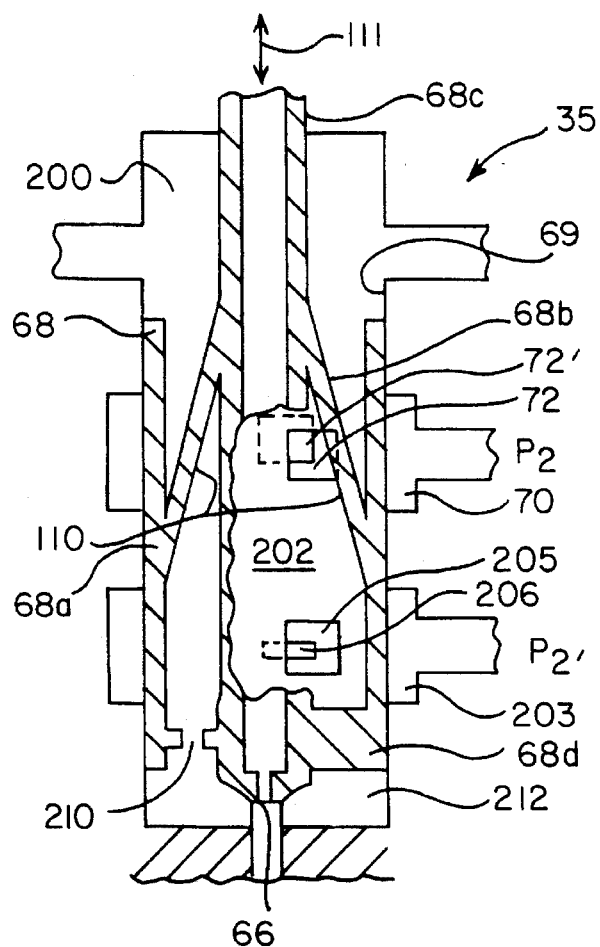
FIG. 4 is a diagram showing a portion of the fuel metering valve and better illustrating the configuration of the fuel metering ports.

Referring now to FIG. 4, there is shown in enlarged form a portion of the fuel valve 35 of FIG. 2. The piston 68 includes a skirt member 68a, a conical portion 68b, and a hollow sleeve member 68c which terminates in the rotatable shaft 107 (FIG. 2). The elements 68a, 68b and 68c, as well as a piston surface 68d, form a unitary assembly which is displaced upwardly and downwardly under the control of the three-dimensional cam and rotated under the control of the pressures responsive bellows. The fuel metering port 72 is formed in the cylindrical skirt 72 and cooperates with a port 72' formed in a sleeve surrounding the skirt 72 (not shown in the drawing), but which couple the high pressure within the upper chamber 200 through the porting arrangement 72, 72' into the cylindrical outlet port 70. The dotted line port 72' in the surrounding sleeve is fixed in position. Thus, whenever the piston 68 moves axially upward, a greater area of the port 72 registers with the outlet port 72', to pass greater fuel flow to the outlet. Conversely, moving the piston 68 downwardly reduces fuel flow. When the pressure sensing bellows rotates the piston 68 in a counterclockwise direction (viewing it from above FIG. 4), the ports 72, 72' are brought into greater congruency, increasing fuel flow. Rotation in the opposite direction has the opposite effect. Thus, the function of the ports 72, 72' and the operation of the piston tend to provide an outlet flow which is a function both demanded mass flow rate and ambient pressure.

It was noted above that a hydraulic follower mechanism causes the piston to move upwardly or downwardly. The hydraulic follower mechanism is based on a pressure maintained within a chamber 202 formed within the elements 68a, 68b, 68c, 68d. A restricting aperture 210 in the piston 62d causes the chamber 202 to communicate with a chamber 212 formed below the piston 68d. Pressure is introduced into the chamber 202 via an inlet 203 which is supplied with pressure $P_2$, (FIG. 2), and passed through a pair of ports 205, 206 arranged in the skirt 68a and surrounding sleeve as are the ports 72, 72'. The degree of registration of the ports 205, 206, and thus the degree of opening of that port controls the rate at which pressure within the chamber can change, and that determines the rate at which the fuel valve follower can translate. In order to translate the fuel valve in the downward direction, the three-dimensional cam follower 65 (see FIG. 2) moves downwardly, opening the pilot port 66 (FIG. 4). Prior to the opening of the pilot port 66, pressure in the chambers 202, 212 had stabilized at $P_{2''}$. Opening of the port 66 tends to port sump pressure $P_B$ from a port 215 which introduces $P_B$ to the inside of the shaft 107, so that $P_B$ ports to the lower chamber 212 whenever the pilot port 66 is open. As a result, pressure within the chamber 212 is reduced, causing the higher pressure $P_{SF}$ acting on the upper portion of the piston 68 (in effect acting on the upper part of the conical portion 68b), to force the piston downwardly until the pilot port 66 is closed. The degree of opening of the port 205, 206 will control the rate at which the piston moves downwardly; the greater the degree of opening of the port 205, 206, the more slowly the piston 68 will translate downwardly.

A condition of approximate pressure balance exists across the piston when it is in the quiescent condition. The pressure $P_{2'}$ acts on the relatively larger area on the underside of the piston 212, and a somewhat higher pressure $P_{SF}$ acts on a somewhat smaller area above the piston to hold the piston in position. That pressure balance, however, will allow the 3-D cam to simply mechanically force the piston 68 upwardly, whenever a rise in the cam demands an upward translation of the piston. This upward translation of the piston will bring a greater area of the port 72, 72' into registry, thus increasing fuel flow through the valve.

It will thus be seen that the amount of fuel metered to the output line 23 is directly controlled by the operational area of the output port 72, 72'. The size of that orifice, in turn, is determined by the degree of congruency between the ports 72, 72' as controlled, in the first instance, by the three-dimensional cam 36, and secondly as adjusted by the ambient pressure $P_0$ (which is a function of altitude). Since the shape of the three-dimensional cam is related to demanded mass flow rate normalized by ambient pressure, and since the ambient pressure input is provided by the pressure-sensing mechanism 100, the result is the setting of the orifice 72, 72' to a size demanded by the mass flow rate determined by the FADEC 32 (FIG. 1), compensated for altitude.

In accordance with the invention, whenever the FADEC fails or is shut down, the mass flow rate of fuel to the engine remains unchanged until the power lever 30 is moved to intentionally demand an adjustment in fuel flow rate. Thus, a failure in the electronic control will not be manifested as a change in operating speed of the engine, either by way of surges or sharp reductions, and the engine will continue to run at the same speed through the transition from electronic to manual control.

In practicing the invention, that important function is accomplished by the three-dimensional cam mechanism and the two axes of control coupled with the mechanical detent which disables one of those axes whenever the electronic control fails or is shut down. Thus, the rotational axis of the three-dimensional cam, which serves as the primary means of control during normal operation, is absolutely disabled upon failure of the electronic control. However, the mechanical control is also coupled to the self-same mechanism for adjusting the fuel valve orifice, and by virtue of using the same three-dimensional cam, having a second axis of control coupled to the mechanical system, the transfer from electronic to manual control is accomplished in a bumpless fashion. Thus, operation of the power lever 30 then acts mechanically through the linkage 75 (as rate limited by the tracking servo 77, 78), to control the three-dimensional cam 36 along only one of the axes, in this case the translation axis 62, to provide a full range of fuel control to the engine, but only under pilot controlled operation of the power lever 30. The electronic system is completely disabled at this point, and is safely locked out of the operational backup control by virtue of the mechanical detent associated with the stepping motor 800. The detent effectively locks the electronic axis from further movement, in effect leaving a single axis of control for mechanical operation.

In implementing one feature of the invention, a position sensor 120 is associated with an operator controlled part of the power control lever 30, to provide an electrical signal on a line 121 to the FADEC 32 (FIG. 1). It will be appreciated that the power lever 30 causes the translation along the translation axis 62 of the three-dimensional cam 36 irrespective of whether the system is operating in the electronic or backup mechanical mode. Thus, in the electronic mode, the position of the power lever 30 is sensed by the FADEC on line 121. It will be recalled that the axial position 62 is rate limited by the tracking servo 77, 78. It is also known that in certain operating conditions of the engine, such as at high speed, for example, the rate of change allowable for the fuel metering valve can be higher than in other operating conditions. The FADEC 32 is programmed to take account of those situations, and when the rate of fuel valve motion can be higher than allowed by the rate limiting tracking servo valve 77, 78, the electrical signal coupled by the FADEC to the electrical actuator 800 causes an additional rotation of the three-dimensional cam 36 to increase the rate of fuel valve motion. As the tracking servo then adjusts the axial position of the 3-D cam along axis 62, the FADEC then backs off the rotational position along axis 63 to ultimately accommodate the precise point on a three-dimensional cam 36 which is the quiescent point for operating the fuel metering valve at the demanded condition. Thus, the rate of change (or performance) can be enhanced by the electronic mode overriding the rate limit of the power lever 30 until the mechanical tracking system "catches up". By virtue of that adjustment, the mechanical position is then coordinated with the electronic position so that if a failure in the electronic system occurs, the fuel valve is in the same electrical and mechanically demanded positions so that transfer from electronic to manual control is bumpless.

In the event of a flameout of the engine, it is desirable to purge all fuel from the engine before a relight is attempted. In practicing the invention, this function is accomplished by the fuel metering unit both in the primary electronic control mode and in the backup manual mode. In order to readily implement such function in both modes, the function is made responsive to the position of the three-dimensional cam 36 which, as will now be apparent, is the control element for both modes. Thus, an auto-start dump system includes a valve member generally indicated at 130 which has a follower 131 riding on the surface of the cam 36. When the power lever 30 is returned to the "off" or purge position, the follower 131 reaches a point on the cam where a valve member 132 is forced off its seat, porting the sump pressure coupled to the valve at 133 to an output 134. The output 134 is coupled by way of a check valve 135 to the spring side of the bypass valve 45. As a result, the reference pressure on the bypass valve 45 is switched from the relatively high $P_2$ pressure level to the sump pressure $P_B$. As a result of that action, the bypass valve 45 fully opens, maximizing bypass flow to the sump via bypass path 29. The pressure $P_{SF}$ thereby significantly drops, and reaches a level below that adequate to maintain the pressurizing valve 55 open. As a result, the pressurizing valve 55 closes, shutting off the flow to the engine by closing off the port which supplies the fuel line 23. A valve 76 coupled to the power lever 30 also dumps $P_{SF}$ to $P_B$ when the power lever is in the "off" position. After a time, the engine, having no additional supply of fuel, is completely purged of fuel, following which the power lever 30 can be returned to a start position, and the engine relighted. By virtue of the fact that the auto-start dump valve 130 is responsive to the cam position, and the cam is the operative control element in both modes of operation, the auto-start dump feature is fully available in both modes.

As a further feature of the system, means are also provided to respond to an engine overspeed condition (in botch modes) to safely limit engine speed, and to do so in a way which prevents flameouts or surges. A conventional overspeed sensor (not shown) provides a signal which energizes an overspeed solenoid 56 whenever the engine goes into an overspeed condition. Energizing the solenoid 56 acts through an overspeed actuator 53 to reduce the pressure $P_{2'}$ supplied to the pressurizing valve (and thus to the engine), thereby reducing fuel flow to the engine and cutting back engine speed.

Referring in greater detail to the overspeed actuator 53, it is seen that the actuator 53 is a complex device having a cylinder body 140 containing several pistons. An overspeed reset piston 141 is intermediate an overspeed rate piston 142 and the operative element, an overspeed pressurizing regulator 143. When the overspeed solenoid 56 is energized, a valve 145 is switched to its alternate condition, porting $P_{SF}$ to an input line 146 connected to the overspeed actuator 53. The high pressure $P_{SF}$ is immediately ported through a check valve 147 to the top of the overspeed reset piston 141. The piston 141 quickly moves to an intermediate position which raises the reference setting for the overspeed pressurizing regulator 143, by increasing the pressure in the chamber 148 between those pistons. The overspeed pressurizing regulator 143 is thus forced downwardly, restricting the flow from the fuel metering valve to the engine. In effect, a further pressure dropping restriction is inserted in the fuel line between the fuel metering valve and the engine. Since the bypass valve 45 is connected to control the pressure from $P_{SF}$ to $P_{2'}$ (downstream of the overspeed pressurizing regulator), the effect of increasing the pressure drop across the overspeed pressurizing regulator is to reduce the pressure drop across the fuel metering port 72, thereby reducing flow to the engine.

Returning to the operation of the overspeed actuator 53, upon initial movement of the piston 141 and the initial partial closing of the overspeed pressurizing regulator 143, the reference setting for the overspeed pressurizing regulator is further reset at a controlled rate by the overspeed rate piston 142 by a rate limiting orifice 150. This results in the reduction of fuel flow to the engine at a rate which is slow enough to avoid flameout, until a fuel flow rate is reached which eliminates the overspeed condition.

Upon elimination of the overspeed condition, the overspeed solenoid 56 is deactivated, porting $P_{2'}$ by way of a rate limiting orifice 152 to the upper side of overspeed rate piston 142. The overspeed reset piston 141 (whose upward travel is limited by movement of the rate piston 142), thereby moves slowly upwardly at a rate controlled by the rate limiting orifice 152 and the rate limiting accomplished by the check valve 147. This slow upward movement slowly removes the fuel line restriction imposed by overspeed pressurizing regulator 143, so that fuel flow to the engine increases slowly to avoid engine surge. The overspeed system cycles on and off in this manner to achieve a rough speed regulation at the set point of the overspeed regulator.

In somewhat greater detail, the initial reduction in flow to the engine upon detection of an overspeed condition is proportional to metered flow because of the force balance on piston 141. When the valve 145 is first changed to its overspeed condition, high pressure $P_{SF}$ is immediately ported to the pistons 141 and 142. Piston 142 moves quickly, pushing piston 143 downwardly to partly close the overspeed restriction formed by valve 52. Movement of piston 141 provides the further reduction in fuel flow to the engine, all the way to idle if necessary, at a rate sufficiently slow to prevent flameout of the engine. The initial reduction in flow is proportional to metered flow, as noted above, because of the force balance on piston 141. Pressure driving the piston 142 downwardly reaches supply pressure $P_{SF}$ at a ratio $(P_{SF}-P_2)/(P_{SF}-P_{2'})$ set by springs and piston sizes.

When the overspeed valve is returned to the normal run position, pressure $P_{2'}$ is then ported to the pistons 141 and 142. Flow increases slowly to the level set by the fuel metering valve. There are no sudden increases in flow which would cause the engine to stall.

Figure 5:
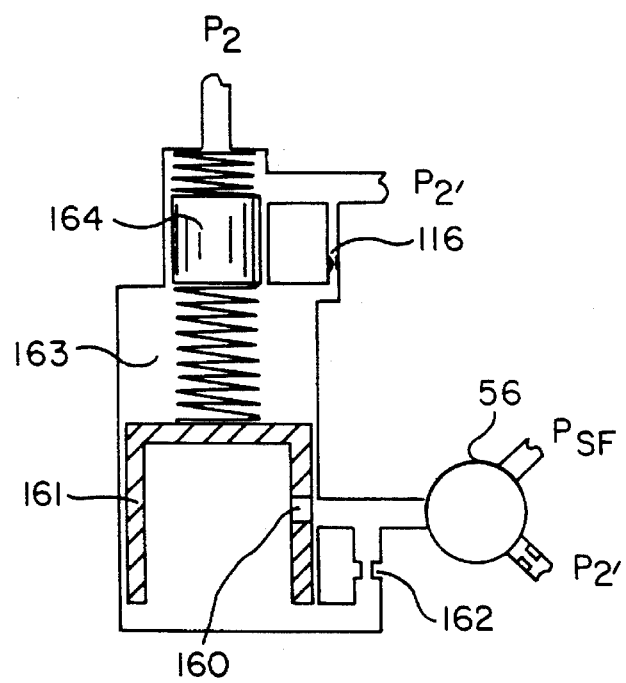
FIG. 5 is a diagram illustrating an alternative overspeed regulator for use in the system of FIG. 2.
Figure 6:
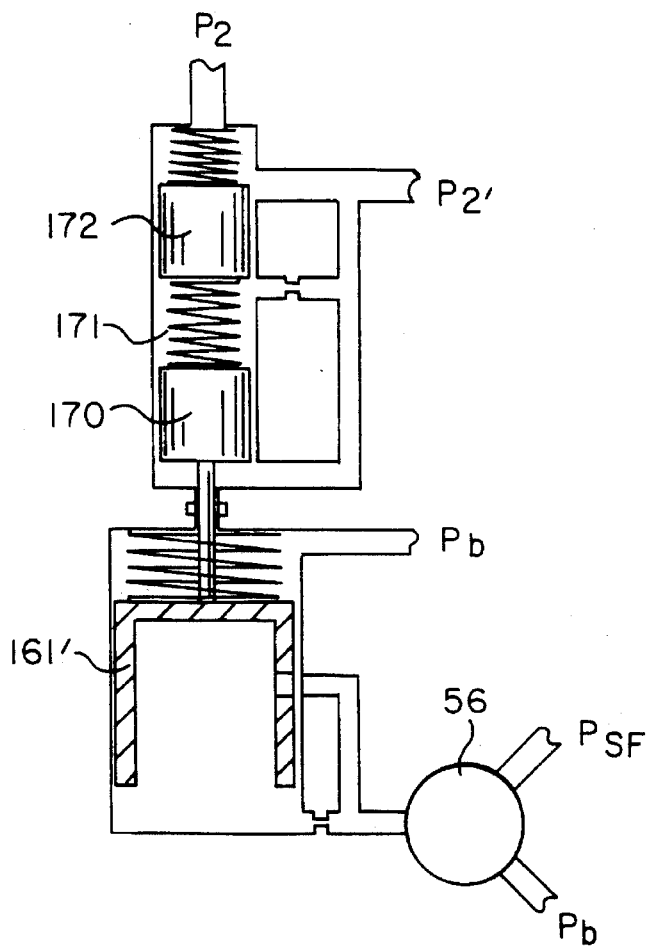
FIG. 6 is a diagram illustrating yet a further alternative overspeed regulator for use in the system of FIG. 2.

FIGS. 5 and 6 show alternative, somewhat simplified versions of other arrangements for the overspeed actuator 53. FIG. 5 shows a two-piston alternative. The overspeed solenoid is shown as a three-way valve 56 which in the overspeed condition ports $P_{SF}$ through an orifice 160 in a large piston 161 and also by way of a rate-limiting orifice 162 to the lower side of the piston 161. Thus, upon actuation of the overspeed solenoid 56, the piston 161 moves rapidly to an intermediate position until the port 160 is closed. Additional upward travel of the piston 161 is performed at a rate controlled by the size of orifice 162. Upward movement of the piston 161 results in a change in pressure in a chamber 162 intermediate the piston 161 and an overspeed pressurizing regulator 164. As a result, the piston 164 moves upwardly, restricting the flow from $P_2$ to $P_2'$, i.e., from the fuel valve to the engine. The initial flow cutback (achieved when the orifice 160 is open), is approximately proportional to metered flow because the spring between pistons 161 and 164 makes the position of piston 164 a function of both $(P_{SF}-P_2)/(P_{SF}-P_{2'})$ and position of piston 161.

When the overspeed condition is corrected, $P_{2'}$ is again ported to the lower portion of piston 161 via rate limiting orifice 162, reducing the pressure below the piston 161, to be balanced by the pressure in chamber 165 achieved via $P_{2'}$ and rate limiting orifice 166, to return the overspeed piston to its normal mode and remove the restriction in the fuel supply imposed by the piston 164.

FIG. 6 illustrates a further two-piston arrangement which is an improvement on the version of FIG. 5 in that it functions in substantially the same way except that it avoids pumping of flow to the metered flow when the pistons move. To that end, a further intermediate piston 170 is provided which is mechanically coupled to the overspeed piston 161'. The overspeed piston 161' moves in the same fashion as the piston 161 of FIG. 5. However, when it moves, drain flow is ported to $P_B$ and thus flow displaced by movement of the piston does not affect metered flow to the engine. Instead, the mechanical movement of piston 170 is sensed in a chamber 171 which causes a regulating piston 172 to move upwardly, imposing a restriction in the fuel line between $P_2$ and $P_{2'}$. Since the pistons 170, 172 are connected by a small chamber 171, flow displaced by the piston 172 is absorbed by movement of the piston 171, resulting in negligible additional flow to be added to or subtracted from the metered flow. Movement of the larger piston 161' does not add to the metered flow because it is referenced to bypass flow $P_B$.

Figure 7:
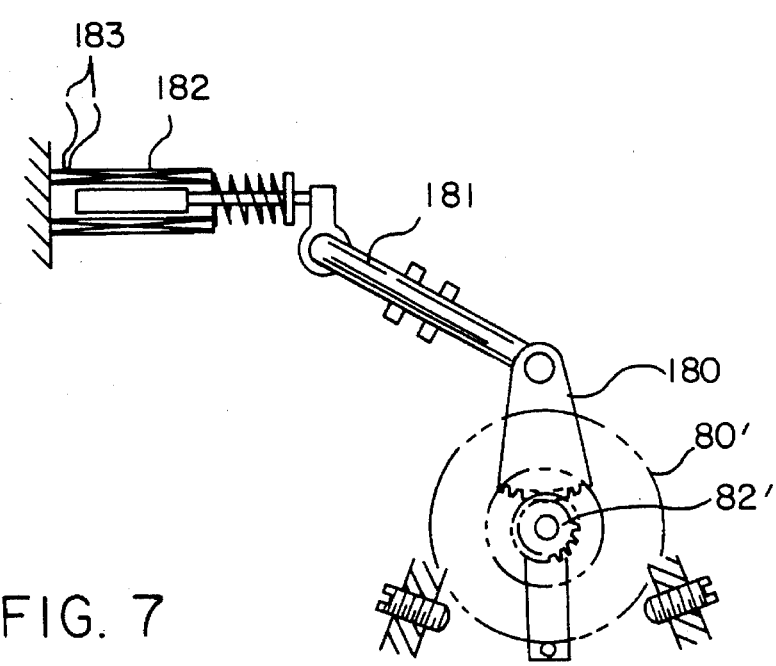
FIG. 7 is a diagram illustrating an alternative electrical actuator for the 3-D cam of the system of FIG. 2 including an electrical feedback means for detecting the position of the electrical actuator.

In some cases, it will be useful to utilize a position sensor to monitor the position of the electrical actuator 800. While it is possible by simple tight feedback electrical control using a high precision stepper motor to have the control maintain a continuing record of actuator position 80 by controlling pulses to the actuator, in many cases, it may be useful to also directly sense the position of the electrical actuator. Indeed, in conditions where something other than a stepper motor is used, such a position sensor may be a necessary element of the implementation. FIG. 7 shows an alternate linkage for an actuator 800'. The actuator 800' is shown in schematic fashion as being coupled to a gear and linkage 82' which is substantially the same as that illustrated in connection with FIG. 2. Coupled to the gear is a meshing gear segment 180 which by means of a mechanical linkage 181 controls the condition of a position sensor, preferably an LVDT sensor 182. Electrical leads 183 from the position sensor are coupled to the electronic control or FADEC 32 (FIG. 1) for providing a continuous electrical readout of the position of the actuator 800, and thereby the position along the electrical axis of the three-dimensional cam 36. It will be recalled that the position along the mechanical axis 62 of the three-dimensional cam is sensed by a position sensor 120 having electrical leads 121 also coupled to the FADEC. Thus, the FADEC, by monitoring the respective axes of the three-dimensional cam 36 is adapted to know exactly the $W_F/P_0$ factor demanded by the system at all times.

The shape of the three-dimensional cam is not shown in detail herein, the shape being generally indicated by the cylindrical shape of the three-dimensional cam 36 of FIG. 2. Suffice it to say that it is within the skill of the art to produce a plot of mass fuel rates to the engine (normalized by altitude or ambient pressure) which are a function both of the position of the power lever 30 as well as the fuel demands of the FADEC 36. Illustrating the complex shape of such a cam in the patent drawings is not believed to be useful. Suffice it to say that the shape in the axial direction is configured such that for any given position along the electronic axis (considering that position to be locked) the power lever is capable of controlling the engine from full power to shutoff. Considering the cam shape in the circumferential direction, that is for any circumference at a given location along the axis of the cam, the shape provides the electronic control with sufficient latitude to control fuel flow to the engine (for that position of the power lever) in an adequate range to meet the demands of the control. That includes not only all of the electronic adjustment which is available about a given power setting for the conditions which can be sensed by the FADEC, but also the compensating changes which can be used to alter fuel flow electronically in response to a rapid movement of the fuel lever.

In any event, the utilization of a 3-D cam which has two axes of control, both operational during normal electronic control of the engine, and one locked out upon failure or disablement of the electronic control, provides the ability to transfer in a bumpless fashion from electronic control to manual backup, thus providing a fuel metering unit for an aircraft such as a helicopter which provides a full electronic control but in a more failsafe condition than has been achieved heretofore.

What is claimed is:

1. A fuel metering unit for an aircraft gas turbine engine having both electronic and manual controls, the fuel metering unit comprising, in combination:

a supply inlet connected to receive fuel at an elevated pressure from a fuel supply, a metered outlet connected to the engine for providing metered fuel flow thereto, a bypass outlet for returning excess fuel flow to the supply;

a fuel metering valve connected between the inlet and the metered outlet for metering the outlet;

a bypass valve for maintaining a substantially constant pressure drop for the fuel metering valve;

a 3-dimensional (3-D) cam having a complex surface for driving a follower to control the fuel metering valve, the three-dimensional cam having one control axis adapted for manual control and another control axis adapted for electronic control;

mechanical means coupling a power lever to the cam for adjustment along the manual control axis to provide manual fuel control;

an electrical actuator coupling the electronic control to the cam for adjustment along the electronic control axis for providing electronic fuel control;

and detent means providing a holding force for locking the actuator in position upon transfer from electronic to manual control thereby to accomplish said transfer without causing a transient in fuel valve position.

2. The fuel metering unit as set forth in claim 1 wherein the electrical actuator is a stepping motor and the detent means comprises a magnetic detent provided by permanent magnets in the stepping motor in the absence of drive signals to the stepping motor.

3. The combination as set forth in claim 1 wherein the mechanical means coupling the power lever to the cam for adjustment along the manual control axis includes a tracking servo having rate limit means for setting a maximum rate of movement for the 3-D cam along the manual control axis in response to movement of the power lever.

4. The combination as set forth in claim 3 further including an electrical sensor for monitoring the position of the power lever, and means coupling the electrical sensor to the electronic control for driving the 3-D cam along the electronic control axis to override the rate limit of the mechanical axis.

5. The combination as set forth in claim 1 further including a pressure sensor for responding to ambient pressure changes occasioned by changes in altitude, and means coupling the pressure sensor to the fuel metering valve for automatically adjusting the fuel delivery rate as a function of altitude under both manual and electronic control.

6. The combination as set forth in claim 5 wherein the pressure monitoring means comprises a pressure sensing bellows mechanically coupled to a linkage for rotating the fuel metering valve to open or close the selected port in dependence on ambient pressure thereby to regulate fuel flow as a function of altitude.

7. The combination as set forth in claim 1 further including an overspeed actuator for responding to an overspeed condition, the overspeed actuator including an overspeed pressurizing regulator operated to controllably restrict fuel flow from the fuel metering valve to the engine thereby to reduce the engine speed below an overspeed limit.

8. The combination as set forth in claim 7 wherein the overspeed actuator further includes a rate limiting means adapted to limit the rate of movement of the overspeed pressurizing regulator to gradually reduce the restriction in flow between the fuel metering valve and the engine after the overspeed condition is corrected.

9. The combination as set forth in claim 7 wherein the overspeed actuator has an overspeed rate piston for limiting the rate of movement of the overspeed pressurizing regulator thereby to prevent engine flameout when correcting an overspeed condition.

10. The combination as set forth in claim 8 wherein the rate of movement of the overspeed pressurizing regulator is regulated so that the overspeed valve can cycle between overspeed and corrected positions to maintain engine speed below the overspeed limit even in conditions of excess fuel flow from the fuel metering valve.

11. The combination as set forth in claim 1 further including:
  a pressurizing valve for sensing the pressure in the fuel supplied to the engine, and means urging the pressurizing valve closed so as to prevent fuel flow to the engine in conditions when the pressure delivered by the fuel metering unit is below a predetermined minimum; and
  the fuel metering unit having an auto-start dump position for altering a reference pressure to the bypass valve adequate to open the bypass valve and reduce the pressure in the fuel supply line, thereby to close the pressurizing valve and purge fuel from the system.

12. The combination as set forth in claim 1 wherein the shape of the 3-D cam produces a position for the follower which is a function of mass flow rate of fuel to the engine normalized by ambient pressure.

13. The combination as set forth in claim 12 wherein the electrical actuator is a stepping motor coupled to the 3-D cam for controlling the rotational position thereof, and the mechanical means is a tracking servo for controlling the axial position of the 3-D cam.

14. The combination as set forth in claim 13 wherein the detent means includes a magnetic detent of the stepping motor, the step size of the stepping motor being selected sufficiently small to provide a closely controlled detent upon loss of drive to the stepping motor, thereby to assure a bumpless transfer to mechanical control upon failure or shutdown of the electronic control.

15. The combination as set forth in claim 14 wherein a fuel metering unit can accept different rates of change in different operating conditions, the rate of change for mechanical control being a constant associated with the tracking servo, and means feeding a signal relating to power level position to the electronic control for overriding the rate limit of the tracking servo in conditions when the electronic control determines a higher rate is available.

16. A fuel metering unit for an aircraft gas turbine engine having both electronic and manual controls, the fuel metering unit comprising, in combination:
  a supply inlet connected to receive fuel at an elevated pressure from a fuel supply, a metered outlet connected to the engine for providing metered fuel flow thereto, a bypass outlet for returning excess fuel flow to the supply;
  a fuel metering valve connected between the inlet and the metered outlet for metering the outlet, the fuel metering valve having a mechanical operator;
  two-axis control means having a control surface which positions the operator of the fuel metering valve for control thereof and having a first control axis for electronic control of the control surface in a first direction and a second control axis for mechanical control of the control surface in a second direction different from the first, the two-axis control means having a first mode in which electronic control operates the first control axis and manual control operates the second control axis to jointly position the control surface, and a second mode in which the electronic axis is disabled and locked in position upon failure or shutdown of the electronic control so that mechanical control operates along the second axis only, whereby transfer from electronic to manual control is accomplished without causing a transient in fuel metering valve position.

17. The combination as set forth in claim 16 further including a power lever having a linkage for direct operation of the mechanical axis of the two-axis control means, and feedback means associated with the power lever for providing a signal to the electronic control for rendering the electronic control responsive to the position of the power lever.

18. The combination as set forth in claim 3 wherein the tracking servo includes gear means having a reduction ratio which contributes to the holding force of the detent means.

19. The combination as set forth in claim 1 including a position sensor for sensing the positioning of the electronic control axis by the electrical actuator.

* * * * *